(12) United States Patent
Clark et al.

(10) Patent No.: US 8,007,743 B2
(45) Date of Patent: *Aug. 30, 2011

(54) MULTIFUNCTIONAL VACUUM MANIFOLD

(75) Inventors: Phil Clark, Wakefield, MA (US); Kurt E. Greenizen, Haverhill, MA (US); John Doyle, Kensington, NH (US)

(73) Assignee: Millipore Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/584,872

(22) Filed: Sep. 14, 2009

(65) Prior Publication Data

US 2010/0009460 A1 Jan. 14, 2010

Related U.S. Application Data

(62) Division of application No. 10/780,463, filed on Feb. 17, 2004, now Pat. No. 7,588,728.

(51) Int. Cl.
*B01D 35/00* (2006.01)

(52) U.S. Cl. ........ 422/534; 422/535; 422/551; 422/552; 422/553; 436/177; 436/178

(58) Field of Classification Search ............ 422/99–104, 422/501, 534, 535, 547, 548, 551, 552, 553; 436/174–178
See application file for complete search history.

(56) References Cited

U.S. PATENT DOCUMENTS

| | | | |
|---|---|---|---|
| 4,734,192 A | 3/1988 | Champion et al. | |
| 4,927,604 A | 5/1990 | Mathus et al. | |
| 5,009,780 A | 4/1991 | Sarrasin | |
| 5,223,133 A * | 6/1993 | Clark et al. ........... 210/232 |
| 5,227,137 A | 7/1993 | Monti et al. | |
| 5,464,541 A | 11/1995 | Aysta et al. | |
| 5,498,545 A | 3/1996 | Vestal | |
| 5,846,493 A | 12/1998 | Bankier et al. | |
| 6,048,457 A | 4/2000 | Kopaciewicz et al. | |
| 6,054,100 A | 4/2000 | Stanchfield et al. | |
| 6,159,368 A | 12/2000 | Moring et al. | |
| 6,200,474 B1 | 3/2001 | Kopaciewicz et al. | |
| 6,451,261 B1 | 9/2002 | Bodner et al. | |
| 6,464,942 B2 | 10/2002 | Coffman et al. | |

(Continued)

FOREIGN PATENT DOCUMENTS

EP 0403679 A1 12/1990

(Continued)

OTHER PUBLICATIONS

European Search Report received for EP Patent Application No. 04009898.0, mailed on Jun. 10, 2005, 3 pages.

(Continued)

*Primary Examiner* — Jill Warden
*Assistant Examiner* — Dwayne K Handy

(57) ABSTRACT

A laboratory device design particularly for a multiplate format that includes a manifold wherein the position of the plate is not a function of gasket compression or vacuum rate applied. In one embodiment, the device has a modular design, wherein one or more removable inserts, preferably with different functionalities can be positioned between a base component and a collar component. The particular insert(s) chosen depend on the desired sample preparation or assay to be carried out. The insert(s) are stacked and are positioned between the base and collar as a unit, so that the stack within the manifold does not move during evacuation of the vacuum chamber. The consistent position of the insert(s) facilitates using vacuum sample processing with automated liquid handlers.

45 Claims, 16 Drawing Sheets

U.S. PATENT DOCUMENTS

| | | |
|---|---|---|
| 6,592,826 B1 | 7/2003 | Bloecker et al. |
| 6,852,289 B2 | 2/2005 | Gordon et al. |
| 6,869,572 B1 | 3/2005 | Kopaciewicz et al. |
| 6,893,582 B2 | 5/2005 | Busnach et al. |
| 7,405,083 B2 | 7/2008 | Chen |
| 7,588,728 B2 * | 9/2009 | Clark et al. ............ 422/100 |
| 2003/0223912 A1 | 12/2003 | Knecht et al. |
| 2004/0228772 A1 | 11/2004 | Chen et al. |
| 2006/0013736 A1 | 1/2006 | Blok et al. |
| 2006/0057032 A1 | 3/2006 | Blok et al. |
| 2009/0023897 A1 | 1/2009 | Chen |

FOREIGN PATENT DOCUMENTS

| | | |
|---|---|---|
| EP | 0408940 A1 | 1/1991 |
| EP | 1074292 A1 | 2/2001 |
| EP | 1358936 A2 | 11/2003 |
| JP | 06-506869 A | 8/1994 |
| JP | 07-051099 A | 2/1995 |
| JP | 10-510501 A | 10/1998 |
| JP | 2001-520394 A | 10/2001 |
| JP | 2002-506386 A | 2/2002 |
| JP | 2004-163396 A | 6/2004 |
| JP | 2004-354376 A | 12/2004 |
| JP | 2005-523009 A | 8/2005 |
| WO | 97/10055 A1 | 3/1997 |
| WO | 98/57746 A2 | 12/1998 |
| WO | 99/20396 A1 | 4/1999 |
| WO | 00/25922 A2 | 5/2000 |
| WO | 01/06003 A2 | 1/2001 |
| WO | 01/19520 A1 | 3/2001 |

OTHER PUBLICATIONS

Extended European Search Report received for EP Patent Application No. 08168844.2, mailed on Dec. 7, 2010, 6 pages.

* cited by examiner

MULTIFUNCTIONAL VACUUM MANIFOLD

CROSS REFERENCE TO RELATED APPLICATIONS

This application is a Divisional patent application of U.S. application Ser. No. 10/780,463, filed on Feb. 17, 2004, now U.S. Pat. No. 7,588,728, issued on Sep. 15, 2009, the entire contents of which are incorporated by reference herein.

BACKGROUND OF THE INVENTION

Test plates for chemical or biochemical analyses, which contain a plurality of individual wells or reaction chambers, are well-known laboratory tools. Such devices have been employed for a broad variety of purposes and assays, and are illustrated in U.S. Pat. Nos. 4,734,192 and 5,009,780, for example. Microporous membrane filters and filtration devices containing the same have become particularly useful with many of the recently developed cell and tissue culture techniques and assays, especially in the fields of bacteriology and immunology. Multiwell plates, used in assays, often utilize a vacuum applied to the underside of the membrane as the driving force to generate fluid flow through the membrane.

The microplate has been used as a convenient format for plate processing such as pipetting, washing, shaking, detecting, storing, etc. A variety of assays have been successfully formatted using multiwell filter plates with vacuum driven follow-through. Applications range from Cell Based assays, genomics and proteomic sample prep to immuno-assays.

An example of a protein digestion sample process may include the following steps:
1. Deposit the protein sample in the wells with the digestion enzymes.
2. Bind or capture the digested protein in or on the filter structure.
3. A series of sample washes where the solutions are transferred to waste by vacuum.
4. Solvent elution to recover the concentrated sample.

Another filter plate application used for a Genomic Sequencing Reaction Clean-up may include the following steps:
1. Deposit the sample into the wells and concentrate product onto the membrane surface by vacuum filtration to waste.
2. A series of sample washes where the solutions are transferred to waste by vacuum. Repeated and then filter to dryness.
3. Re-suspend the sample on the membrane and aspirate off the re-suspended sample from the membrane surface.

Washing to waste is easily accomplished with virtually any of the conventional manifolds available. During a wash step, a relatively large volume (greater than 50 .mu.l) of aqueous solution is added to the wells and drawn to waste. The orientation of the plate is not critical when adding a large volume of liquid, as long as the transfer pipette or other device is able to access the well opening. However with the Protein Digestion example, the elution volumes are relatively small (less than 15 .mu.l) and can be as low as about 1 .mu.l. This small volume needs to be deposited directly on the filter structure in the well to insure the solvent is drawn through the structure for complete elution of the sample. With the other example, Sequencing Reaction Clean-up, the final concentrated sample is between 10-20 .mu.l and must be aspirated off the membrane without damaging the membrane surface.

Many of these and other protocols require the addition of small accurate liquid volumes. When using filter bottom plates the performance benefit is achieved because of the follow-through nature of the filter. To achieve flow through the filter a pressure differential is applied. When using automated equipment, vacuum filtration is the preferred method because of its convenience and safety. To filter by vacuum, many manufacturers provide a vacuum manifold for their products and equipment. Still, accurate liquid transfer is not possible on the deck of a conventional liquid handler, because the position of the plate in the Z-direction can vary during use. Indeed, all of the standard manifolds available today use a compressible gasket material to seal the filter plate, and during the evacuation of the vacuum chamber in the manifold, the plate moves as the gasket is compressed. The amount of plate movement varies, depending in part upon the durometer of the gasket used and the vacuum pressure that is applied. The amount of movement is too great or variable to be able to program a liquid handling robot to account for the movement, making successful, reproducible automated transfer difficult or impossible. Similar problems arise with the Sequencing clean-up where the small volume is aspirated off the surface of the membrane. If the position of the membrane varies then it is not possible to program the automated equipment to aspirate off the surface of the membrane without potentially damaging the membrane surface.

Additionally, to insure quantitative transfer of filtrate from a 384-well filter plate into a collection plate, the spouts must be as close to the collection plate openings as possible. The available manifolds have a gasket sealing to the underside of the filter plate, and thus the only way to use these manifolds to achieve quality transfers is to have the spouts extend below the plate flange and into the wells of the collection plate. However, in such a design, the spouts are exposed and are thus prone to damage and/or contamination.

It is therefore an object of the present invention to provide a vacuum manifold assembly that is readily adapted to automation protocols.

It is another object of the present invention to provide a vacuum manifold assembly that fixes the position of a sample-processing device, such as a multiwell plate, regardless of the vacuum applied.

It is a further object of the present invention to provide a vacuum manifold assembly with features that enable quantitative filtrate transfer to a collection well when used with multiwell plates with dense arrays of wells.

It is another object of the present invention to provide a vacuum manifold assembly that enables direct transfer on an analytical device such as and MALDI target.

It is still another object of the present invention to provide a vacuum manifold assembly that is modular and adaptable to a variety of applications.

SUMMARY OF THE INVENTION

The problems of the prior art have been overcome by the present invention, which provides a laboratory device design particularly for a multiwell plate format that includes a manifold wherein the position of the plate is not a function of gasket compression or vacuum rate applied. The design also can be used with a single well device, particularly when small volume liquid processing applies. In one embodiment of the present invention, the device has a modular design, wherein removable inserts with different functionalities can be positioned between a base component and a collar component. The particular inserts chosen depend on the desired sample preparation or assay to be carried out. The inserts are stacked and are positioned between the base and collar as a unit, so variation in height of the stack within the manifold is as a unit and is constant; i.e., there is no relative movement of one insert with respect to another insert, even upon evacuation of the vacuum chamber. Therefore, the automated liquid handlers can be programmed to position the pipette tip in close proximity to the well bottom or filter surface for small volume dispensing or aspirating.

DETAILED DESCRIPTION OF THE INVENTION

Figure 1:
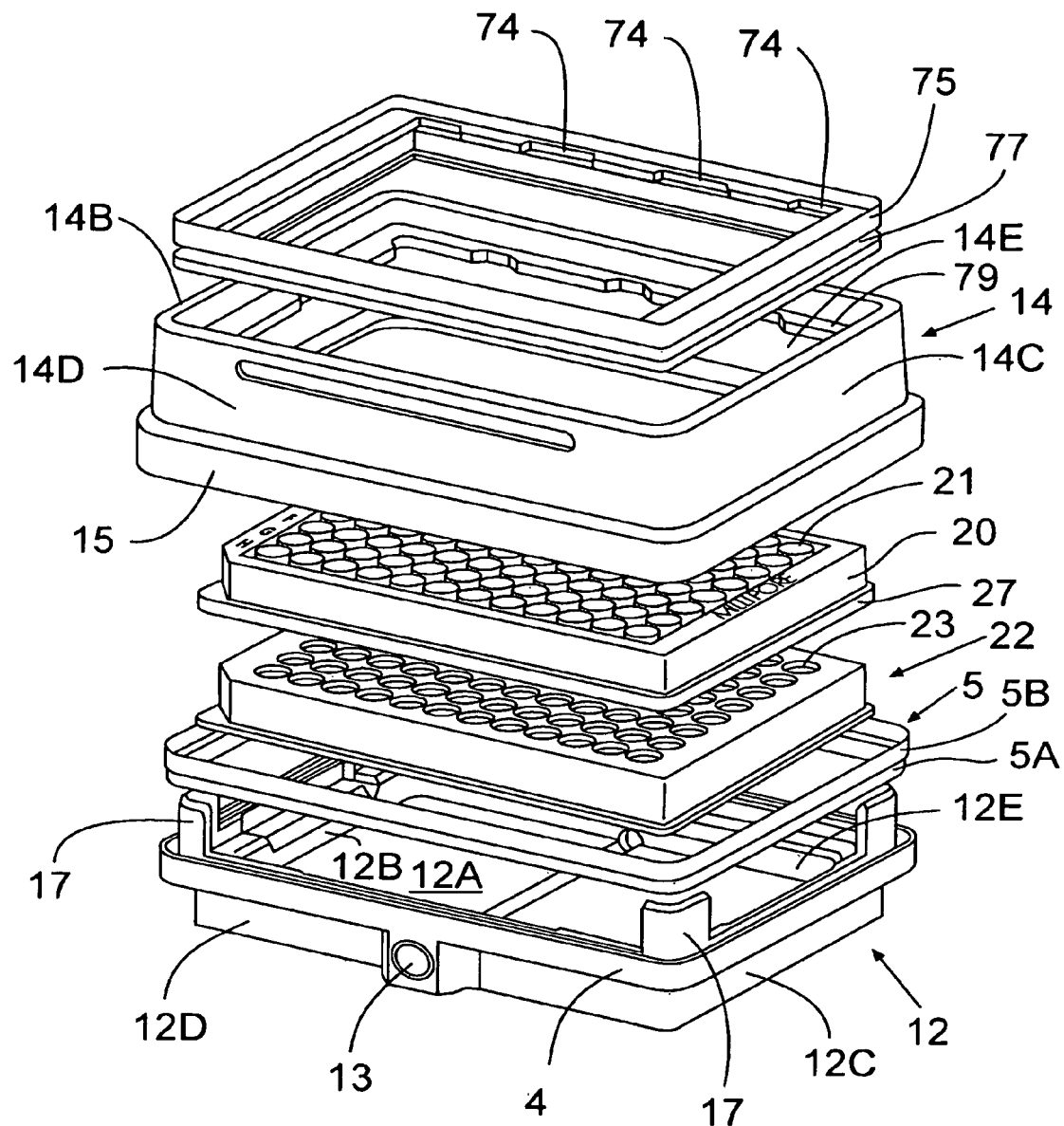
FIG. 1 is an exploded view of a manifold assembly in accordance with an embodiment of the present invention.
Figure 14:
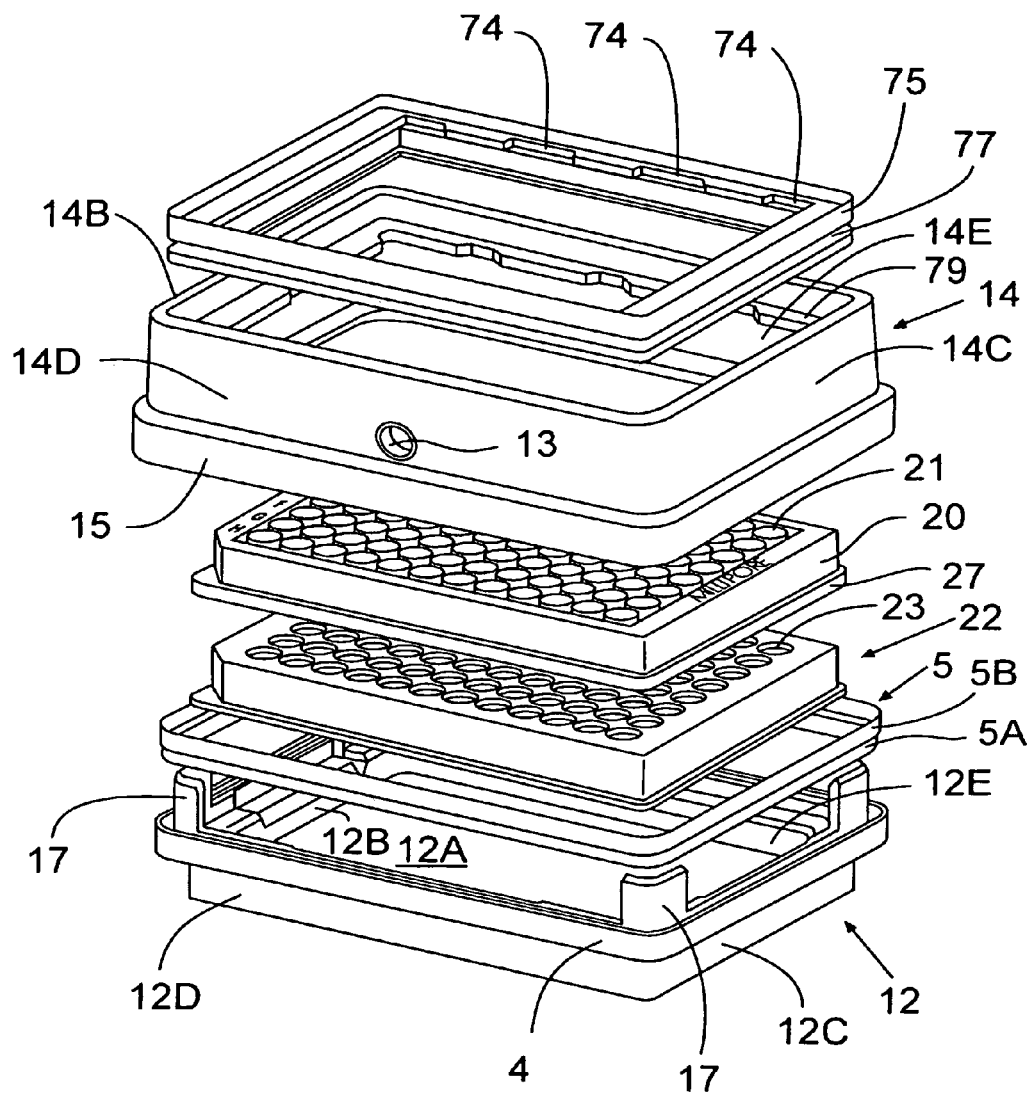
FIG. 14 is an exploded view of a manifold assembly in accordance with another embodiment of the present invention.

There are two common components in the vacuum manifold assembly in accordance with the present invention, regardless of the application. With reference to FIG. 1, the common components are a base 12 and a collar 14, together sized and configured to contain sample-processing components. The base 12 optionally includes a port 13 for communication with a driving force, such as a source of vacuum, preferably a vacuum pump. Alternatively, the port 13 maybe located in a wall of the collar as shown in FIG. 14. The base 12 also includes a bottom 12A and one or more sidewalls upstanding therefrom. In the rectangular embodiment shown, there are four connecting sidewalls, namely, opposite sidewalls 12B and 12C, and opposite sidewalls 12D and 12E. The base includes an outer peripheral flange 4 that in combination with an inner peripheral portion of the sidewalls forms a peripheral groove 6 (FIG. 8) that receives gasket 5. Preferably the gasket 5 has a lower peripheral portion 5A that seats in the groove 6 and a top peripheral portion 5B that extends above the groove 6. The upper portion 5B is skewed outwardly so that when the lower portion 5A of the gasket is in place in the groove 6, the upper portion 5B it is aligned or substantially aligned with the outer surface of the side walls 12B, 12C, 12D and 12E. The gasket 5 thus creates a seal between the base 12 and the component in contact with the gasket 5, such as the collar 14, as discussed in greater detail below. Optionally, and as shown in FIG. 1, one can have of one or more alignment tabs 17 that arise up from the base, preferably at one or more of the intersections of the adjacent sidewalls. The one or more tabs 17 are used to help position the sample processing units (filter plates, MALDI target supports, collection plates, spacers and/or inserts, described below in more detail) into the base 12 and to align the collar 14 to the base 12. Other configurations are within the scope of the invention, provided a seal is created.

Figure 2:
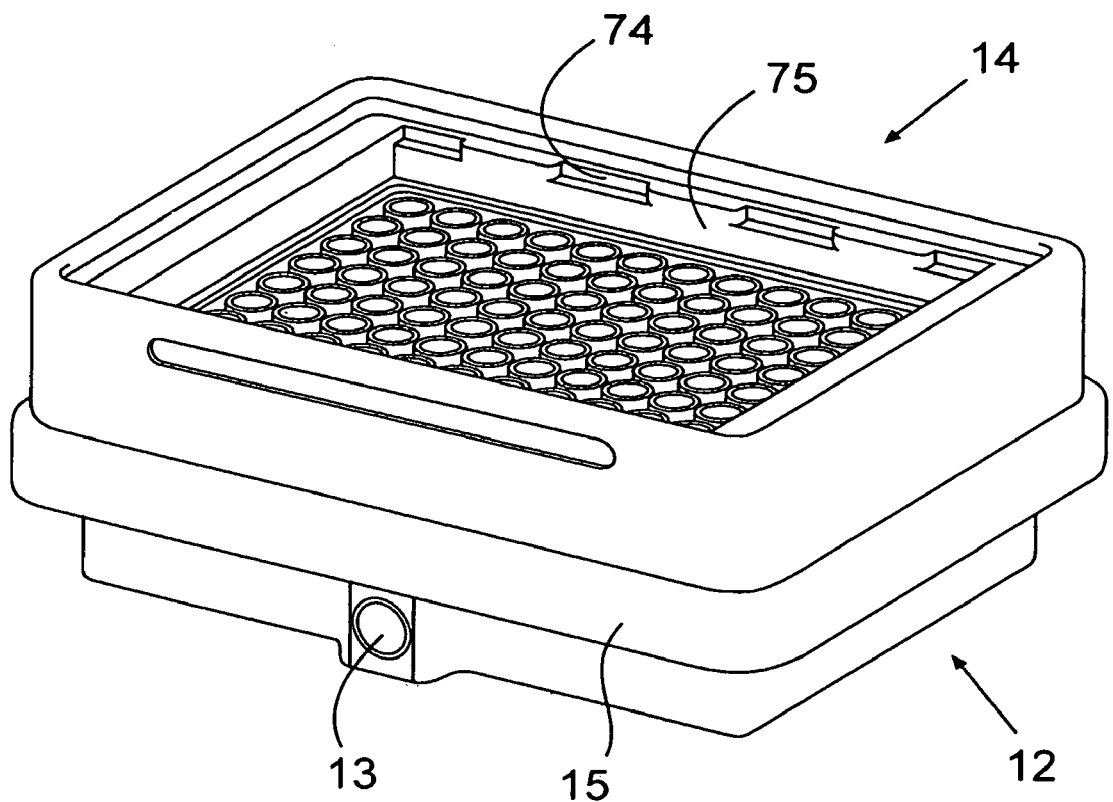
FIG. 2 is a perspective view of the manifold assembly shown in an assembled condition.

In the embodiment shown, collar 14 also has four lateral walls, namely, opposite walls 14B, 14C and opposite walls 14D, 14E. The lateral walls must extend downwardly (and/or the side walls of the base 12 must extend upwardly) a distance sufficient to accommodate the components that are positioned between the collar 14 and the base 12. The vertical length of these lateral walls (and/or the side walls) thus can vary depending upon the application. A skirt 15 preferably is formed along the bottom periphery of the lateral walls such that the skirt 15 positions over the peripheral portion 4 of the base 12 in sealing relationship when in the assembled condition, as seen in FIG. 2. A gasket 75 is attached to the inner, top surface of the collar 14 around the top opening and is designed to seal against the top surface of a component disposed against the collar, as discussed in greater detail below. The gasket 75 preferably includes a peripheral slot 77 that mates with a corresponding inner peripheral rib 79 in the collar 14, shown in FIG. 7. A plurality of rectangular steps 74 may also be provided in the gasket 75, shown in FIG. 2, to mate with support insert 37 shown in FIG. 5.

Figure 9:
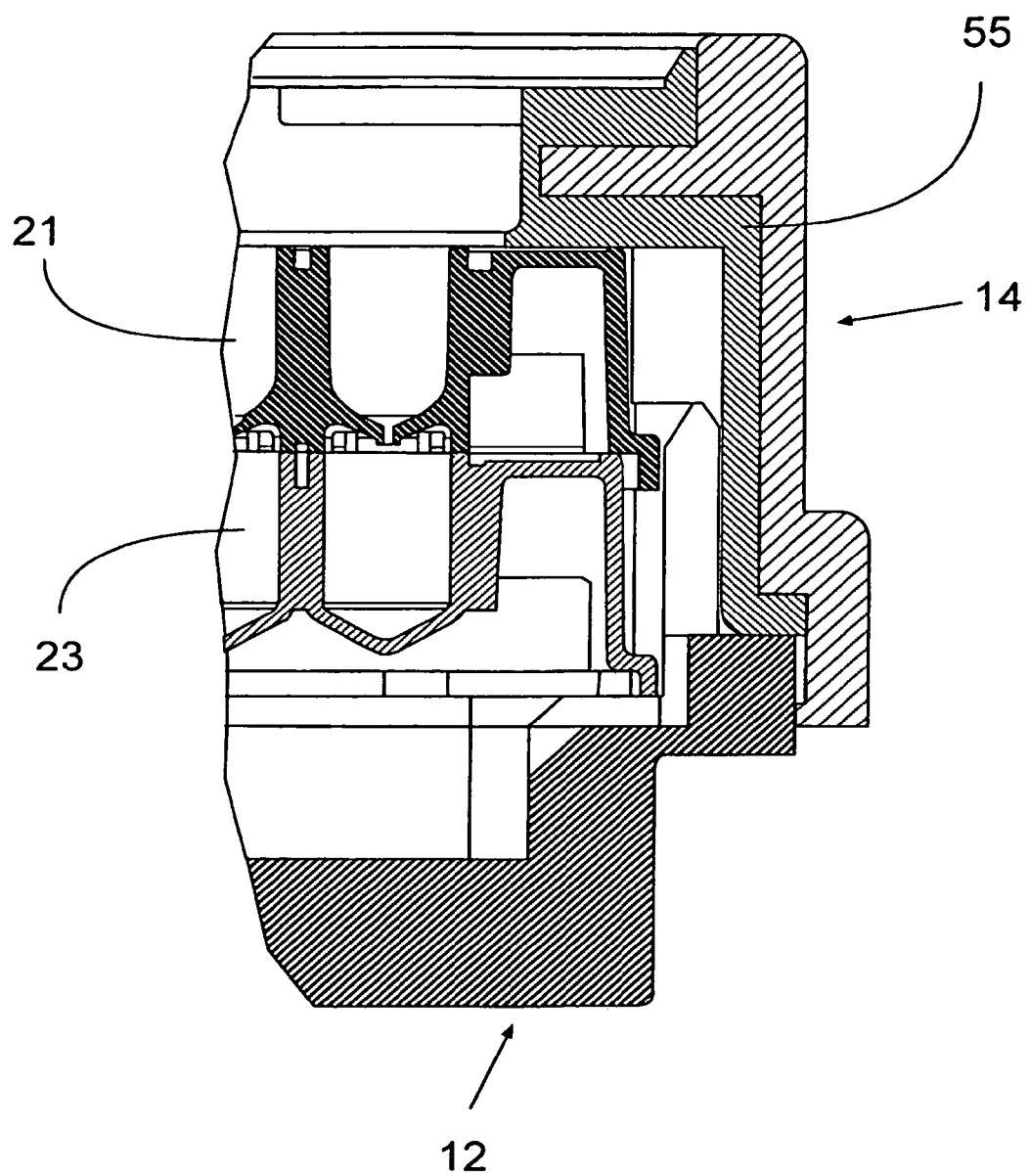
FIG. 9 is a cross-sectional view of the manifold assembly with a unitary common gasket used for sealing.
Figure 10:
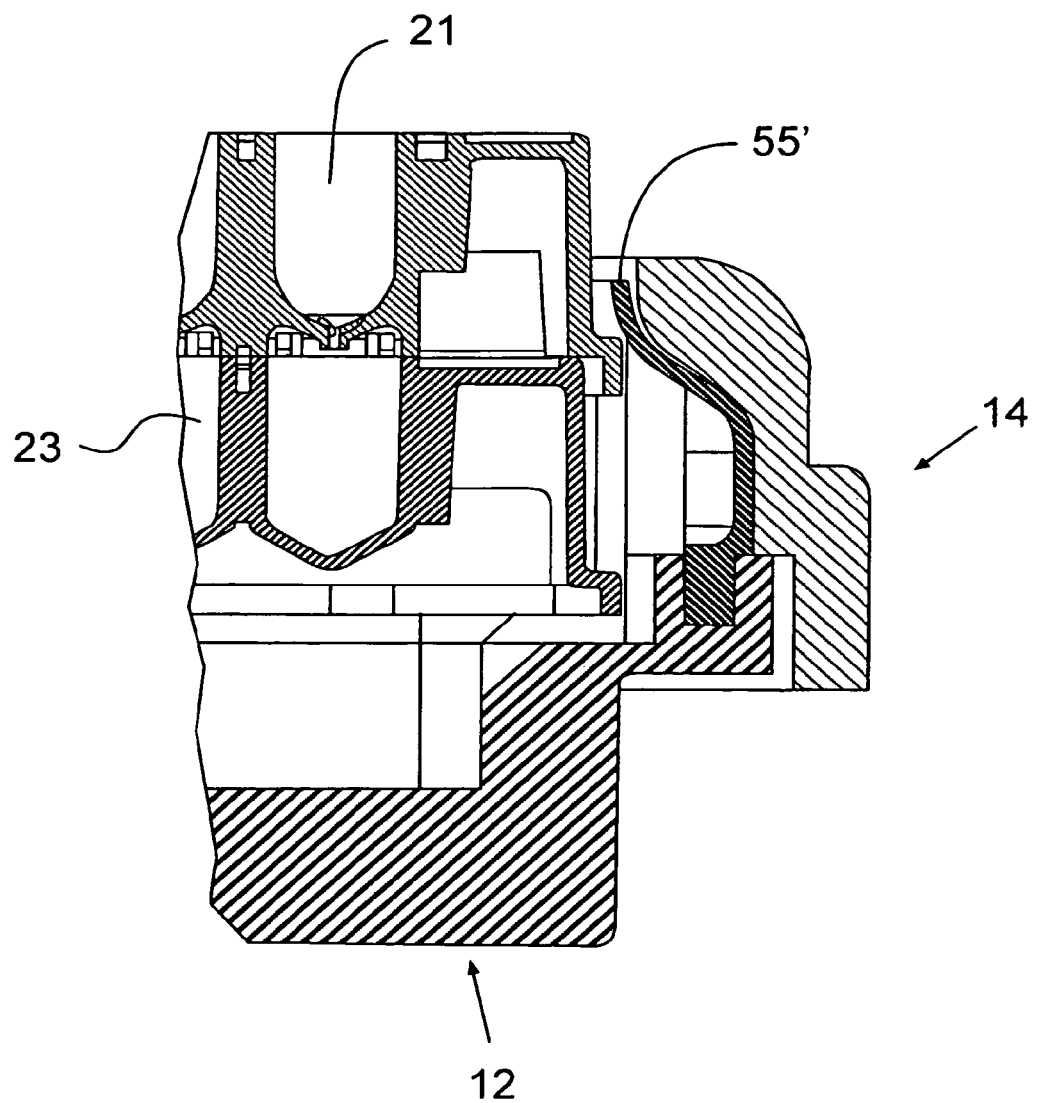
FIG. 10 is a cross-sectional view of the manifold assembly with a unitary flexible gasket used for sealing.

It will be understood by those skilled in the art that the invention is not limited to any particular sealing means. For example, instead of separate gaskets that seal the collar and the base, a single unitary gasket 55 or flexible unitary gasket 55' could be used, such as is shown in FIGS. 9 and 10.

It also will be understood by those skilled in the art that the invention is not limited to any particular sample processing device; devices that enable filtration, collection, digestion of protein by enzymes, wash steps, solvent elution, MALDI TOF, sequencing, PCR clean-up, cell growth, cell lysis, DNA or RNA capture, assaying, etc. can be used in the present invention.

Figure 15:
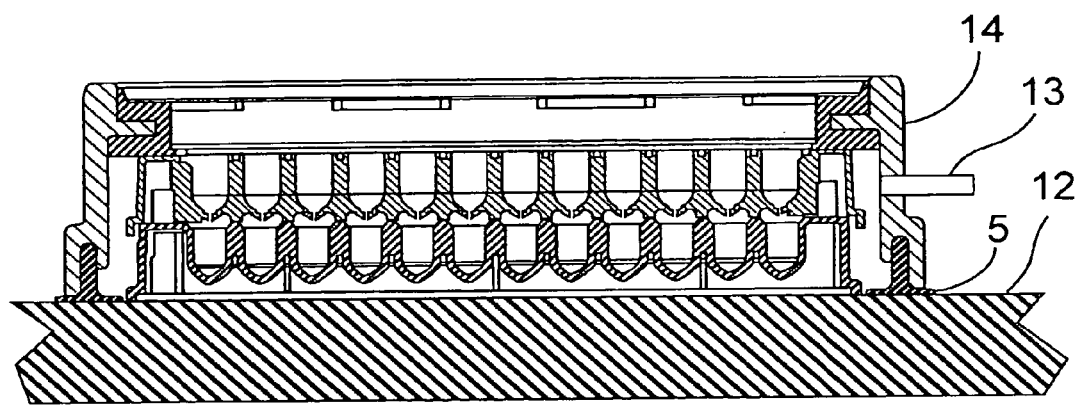
FIG. 15 is a cross-sectional view of a manifold assembly in accordance with a further embodiment of the present invention.

Those skilled in the art will understand that the port for the driving force such as a vacuum port could be in the base 12 as in FIG. 1 or the collar 14 as in FIG. 14. When the vacuum is used in the collar 14, a separate and distinct base becomes an optional, although preferred element of the invention. As shown in FIG. 15, with the port 13 in the collar 14 one may if so desired use any relatively flat surface-such as a bench top, the floor or a wall as the base 12 and the seal is formed by the collar and the first seal between the collar and base (the surface against which it is placed).

The present invention can be used with a variety of plates and other components that are generally used in such plate systems. These include but are not limited to microporous filter plates, ultrafiltration filter plates, chromatographic plates (either containing chromatography media or having a monolithic structure containing such media cast in place in a portion of the plate), cell harvester plates, cell growth plates such as Caco 2 cell growth plates, cell lysis plates, DNA or RNA or plasmid capture plates, collections plates with single or multiple wells, MALDI target trays and/or MALDI targets and the like.

A single plate may be used with the present manifold if desired, either within the collar or on top of the collar (as explained in more detail below). Generally, two or more plates can be used together by stacking them in the proper arrangement such as a microporous filter plate on top of a ultrafilter filtration plate that is on top of collection plate, a microporous filter plate on top of a collection plate, a ultrafilter filtration plate on top of collection plate, a filter plate on top of a chromatographic plate or a DNA or RNA or plasmid capture plate, or the like.

Additionally, spacers may be placed between the plates or under the plate(s) if desired or required for a particular application. Likewise, flow director plates, separate underdrain plates or spout plates between adjacent plates or wicks such as are shown in our co-pending application U.S. Ser. No. 09/565,963, filed May 20, 2000, may also be used in the present invention to direct the flow of fluid in a particular manner. A variety of adaptor plates, half or quarter plates with different configurations and/or characteristics may also be used in the present invention.

Depending upon the application, generally the sample processing components are molded parts and are solvent compatible. The sample processing devices include single well and multiwell devices. Metals, polyolefins and filled nylon are suitable materials of construction. Rarely used components can be machined. In the embodiment shown in FIGS. 1 and 7, the sample processing devices positioned between the base 12 and collar 14 are a filter plate 20 and a collection plate 22, both preferably being made of polyethylene, and thus the length of the lateral walls of collar 14 (and/or the side walls of the base 12) is made sufficient to accommodate these components when assembled to the base 12. In the embodiment shown in FIG. 11, the sample processing devices positioned between the base 12 and collar 14 are filter plates 20 and 20A and a collection plate 22. The filter plates 20 and 20A, and the collection plate 22 are configured for proper stacking and alignment as is known in the art.

Figure 7:
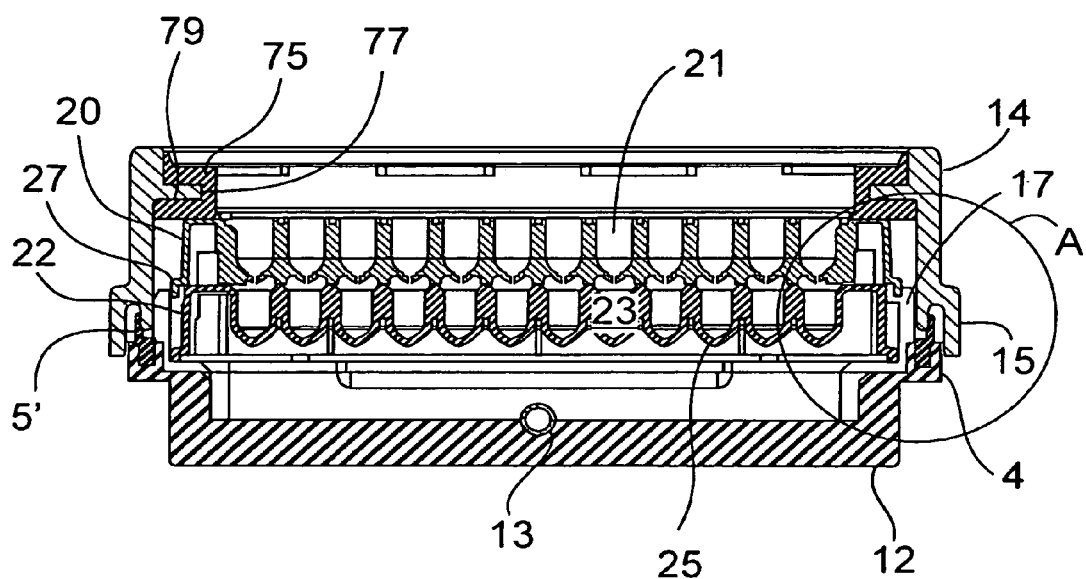
FIG. 7 is a cross-sectional view of the manifold assembly with a bottom gasket in accordance with an embodiment of the present invention.
Figure 8:
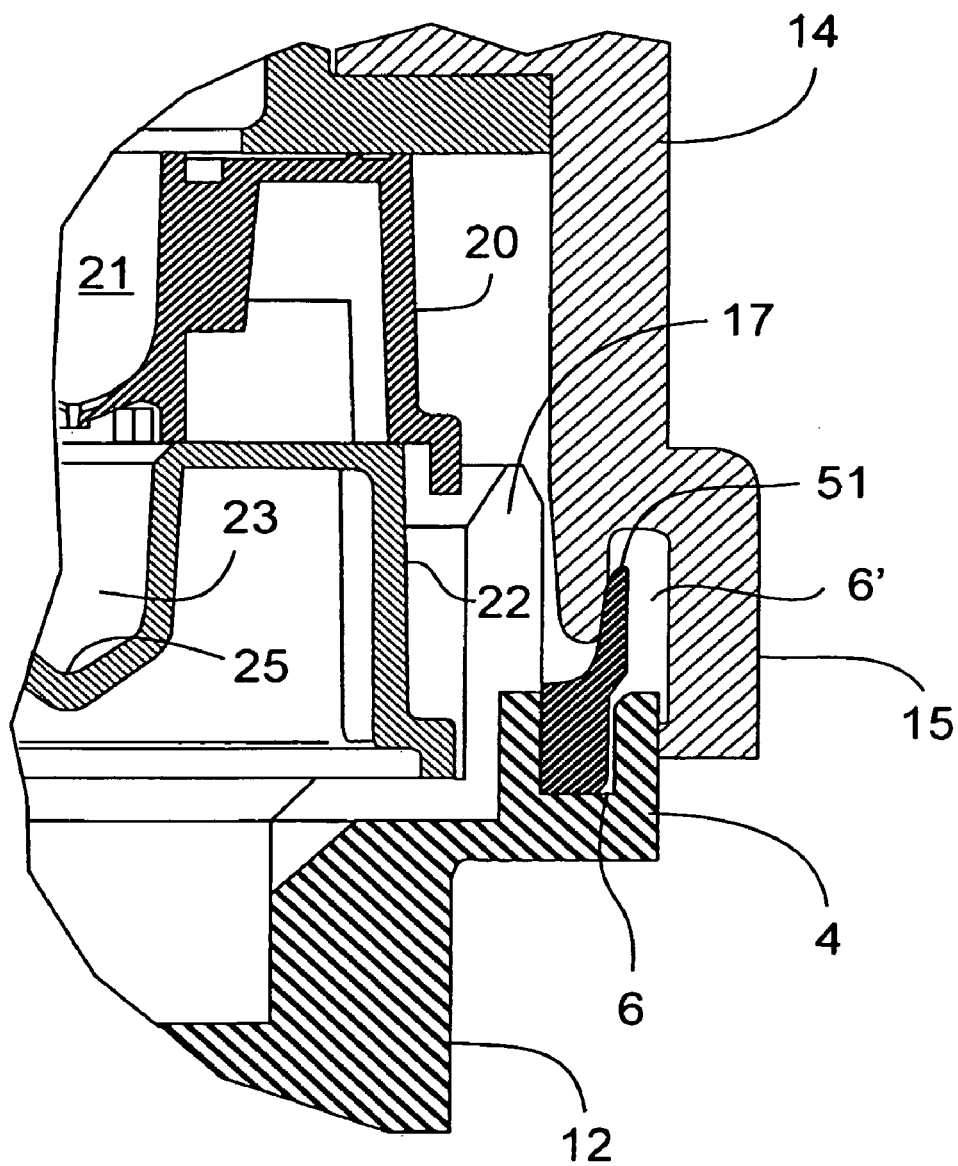
FIG. 8 is a cross-sectional view of Detail A of FIG. 7.
Figure 11:
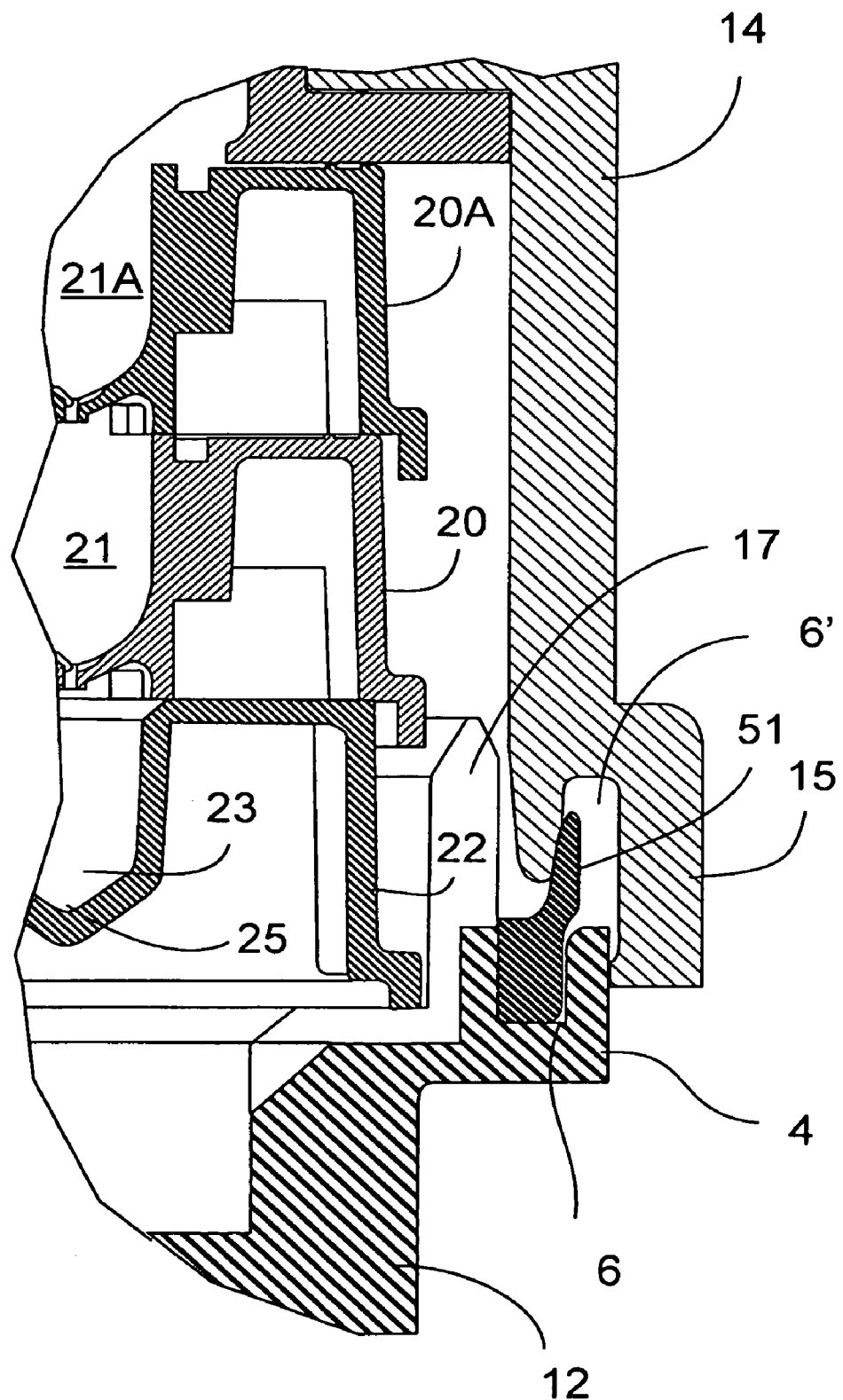
FIG. 11 is a cross-sectional view of the manifold assembly for three plates.

The filter plates 20 and 20A includes a plurality of wells 21 and 21A, preferably arranged in an ordered two-dimensional array. Although a 96-well plate array is illustrated, those skilled in the art will appreciate that the number of wells is not limited to 96; standard formats with 384 or fewer or more wells are within the scope of the present invention. The wells are preferably cylindrical with fluid-impermeable walls, and have a width and depth according to the desired use and amount of contents to be sampled. The wells are preferably interconnected and arranged in a uniform array, with uniform depths so that the tops and bottoms of the wells are planar or substantially planar. Preferably the array of wells comprises parallel rows of wells and parallel columns of wells, such that each well not situated on the outer perimeter of the plate is surrounded by eight other wells. Preferably the plates 20 and 20A are generally rectangular, and as shown in FIGS. 7 and 8, plate 20 is stacked on top of a collection plate 22. Alternatively, as shown in FIG. 11, plate 20A is stacked on top of a plate 20, which is stacked on top of collection plate 22. The filter plates 20 and 20A can be of a conventional design.

Each of the wells 21 of the filter plate 20 includes a membrane or porous structure (not shown) sealed to or positioned in the well. The sealing can be accomplished by any suitable means, including heat-sealing, sealing with ultrasonics, solvents, adhesives, by diffusion bonding, compression such as by a ring or skive, etc. The type of membrane suitable is not particularly limited, and by way of example can include nitrocellulose, cellulose acetate, polycarbonate, polypropylene and PVDF microporous membranes, or ultrafiltration membranes such as those made from polysulfone, PVDF, cellulose or the like. Additionally, materials also include glass fibers, glass mats, glass cloths, depth filters, nonwovens, woven meshes and the like or combinations there of, depending upon the application, or the membrane can be cast-in-place as disclosed in U.S. Pat. Nos. 6,048,457 and 6,200,474, the disclosures of which are hereby incorporated by reference. A single membrane covering all of the wells could be used, or each well can contain or be associated with its own membrane that can be the same or different from the membrane associated with one or more of the other wells. Each such membrane support is preferably coextensive with the bottom of its respective well.

Each of the wells 21 of the filter plate 20 also includes an outlet, preferably in the form of a spout that is centrally located with respect to each well 21 and preferably does not extend below the plate skirt.

Figure 3:
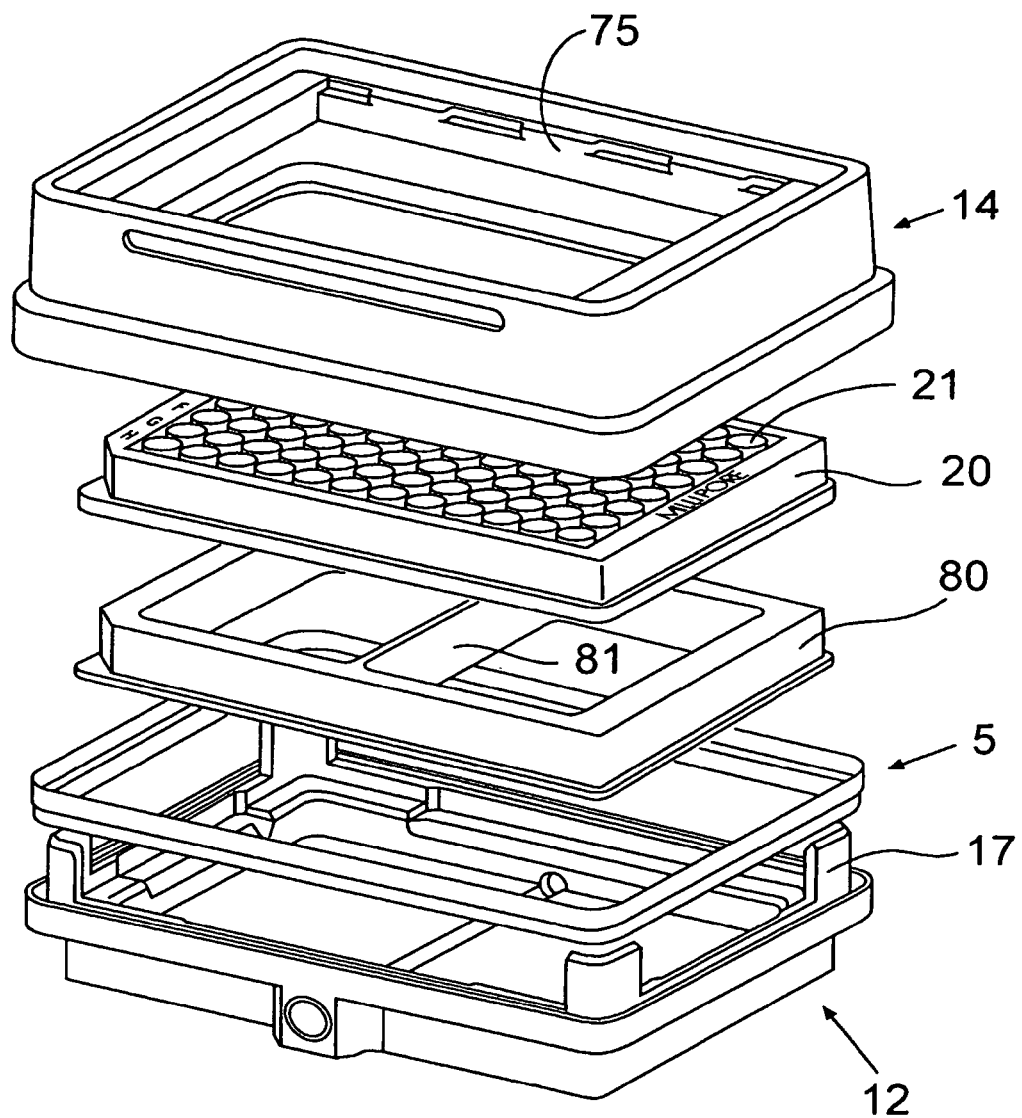
FIG. 3 is an exploded view of a manifold assembly in accordance with an alternative embodiment of the present invention.

The collection plate 22 preferably is also generally rectangular, and includes a plurality of openings 23. Each opening 23 corresponds to a well 21 of the filtration plate, such that when in the assembled condition, each well 21 of the filter plate 20 is registered with and thus in fluid communication with a respective opening 23 of the collection plate 22. Each opening 23 terminates in a bottom 25, which is preferably closed unless it is an intermediate plate with a collection plate below it or the manifold itself acts as a sump or collection plate where optionally a spacer, such as is shown in FIG. 3 and discussed below, may be used. The collection plate 22 can be of a conventional design.

The filter plate 20 has a lower peripheral skirt 27 that allows it to be stacked over the collection plate 22. When the filter plate 20 is stacked over the collection plate 22 as in the FIG. 1 embodiment, proper alignment is ensured, such that each of the spouts is positioned directly over and in close proximity to a respective opening 23 in the collection plate 22. The proximity and alignment of each spout with a respective opening prevents cross-talk among neighboring wells. The stacked plates are positioned inside the base 12 as an integral unit. The collar 14 is positioned over the two plates and sits against the base flange gasket 5, which seals the base 12 to the collar 14. This also positions the collar gasket 75 on the top perimeter edge of the filter plate 20. When vacuum is applied to the manifold, the collar 14 is the only moving component. As additional vacuum is applied, the vacuum causes the collar 14 to compress both gaskets. However, the filter plate 20 and collection plate 21 remain fixed in the loaded position because they make up a solid stack assembly that includes the base 12, the collection plate 21 and the filter plate 20 that is independent of and not influenced by the relative movement of the collar 14. Thus, the stack height of the filter plate and collection plate remains constant. A liquid handler can be programmed to dispense onto the membrane in the filter plate 20, regardless of whether the assembly is under vacuum, since the stack height is not changed by the application of vacuum. The assembly, therefore, is readily adaptable to automation protocols and allows for quantitative filtrate transfer.

Similarly, when using an alternative embodiment of one seal such as shown in FIGS. 9 and 10 a similar sealing action occurs wherein the collar 14 moves to compress the gasket. The height of the plate(s) remains the same with or without the application of the vacuum.

Since the manifold design of the present invention is modular, different components can be positioned between the base and the collar (as mentioned above), allowing a variety of applications to be performed. In one embodiment, (FIG. 3) where the application requires a filter plate 20, but does not require a collection plate 22, a spacer or removable support 80 can replace the collection plate thereby maintaining the unit stack height (FIG. 3). The spacer or removable support 80 positions the filter plate 20 in the proper x- and y-axis orientation so that robotics can deliver sample to the wells 21 of the filter plate 20. It also positions the filter plate 20 at the proper stack height so that the collar 14 can seal to the base 12 and plate 20 simultaneously upon the application of vacuum. Accordingly, preferably the spacer or support 80 is dimensioned similar to the collection plate 20, as shown. In the embodiment shown, the spacer or support 80 includes a central beam 81 (positioned so as to not interfere with the operation of the filter plate) to help support the filter plate 20.

The top seal gasket 75 on the collar 14 can be used to create a seal when it is desired to carry out a quick wash procedure by placing the filter plate on top of the collar 14 rather than inside the manifold assembly. Indeed, this gasket can accept a variety of support structures for use with unique applications, such as a MULTISCREEN®. Underdrain support grid commercially available from Millipore Corporation.

FIGS. 7 and 8 illustrate one embodiment of a bottom gasket 5'. In this embodiment, the gasket 5' is positioned in the groove 6 in base 12 as best seen in FIG. 8. It includes a wiper portion 51 that extends above the groove 6 and into recess 6' formed in skirt 15 of the collar 14 as shown. The height of the wiper portion 51 and its position in the recess 6' allows for some variability in the positioning of the collar 14 and base 12 (and thus variability in the stack height of the components contained between the collar and base) without sacrificing the integrity of the seal.

Figure 4A:
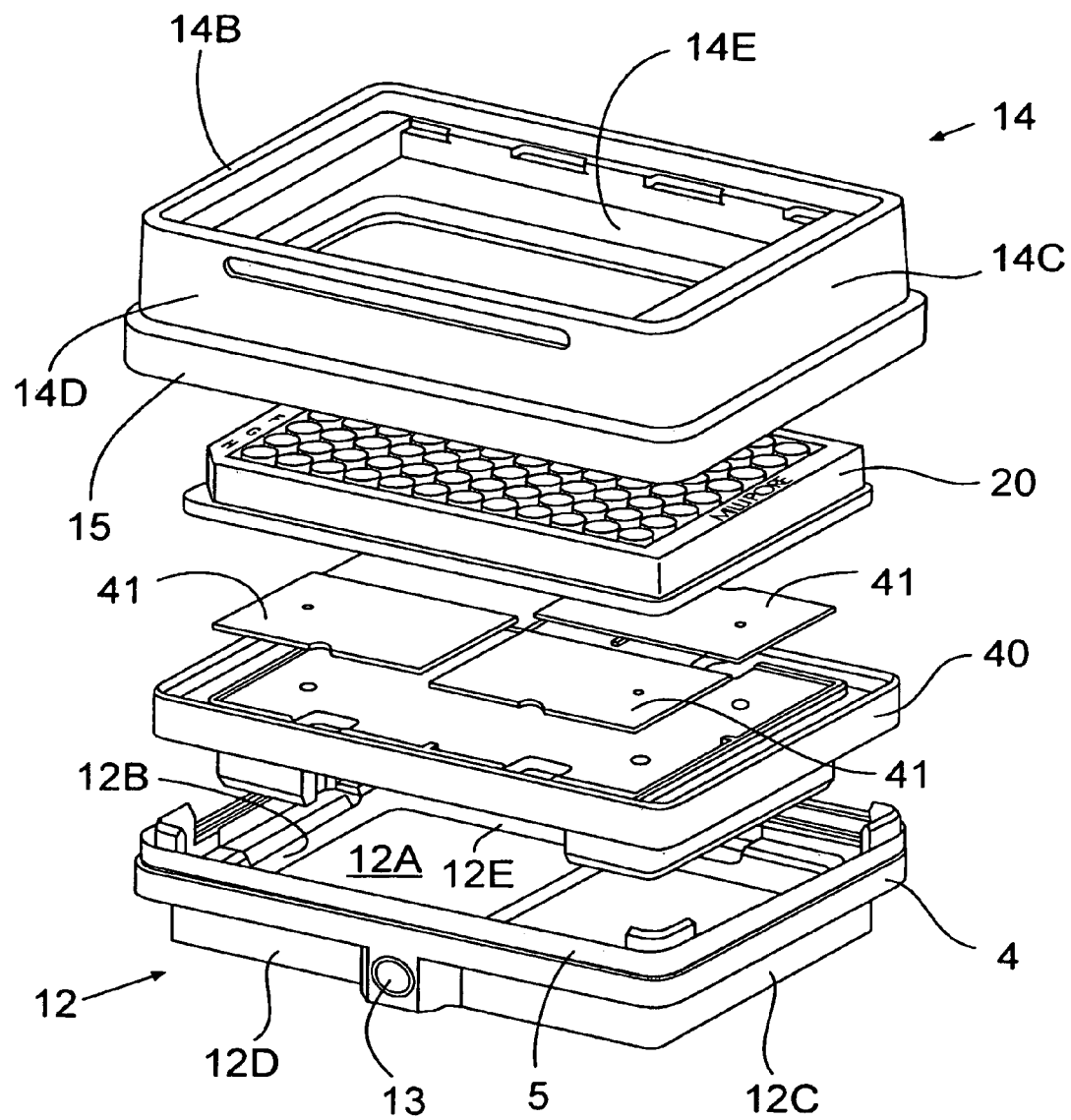
FIGS. 4A and 4B are exploded views of a manifold assembly in accordance with another embodiment of the present invention.
Figure 4B:
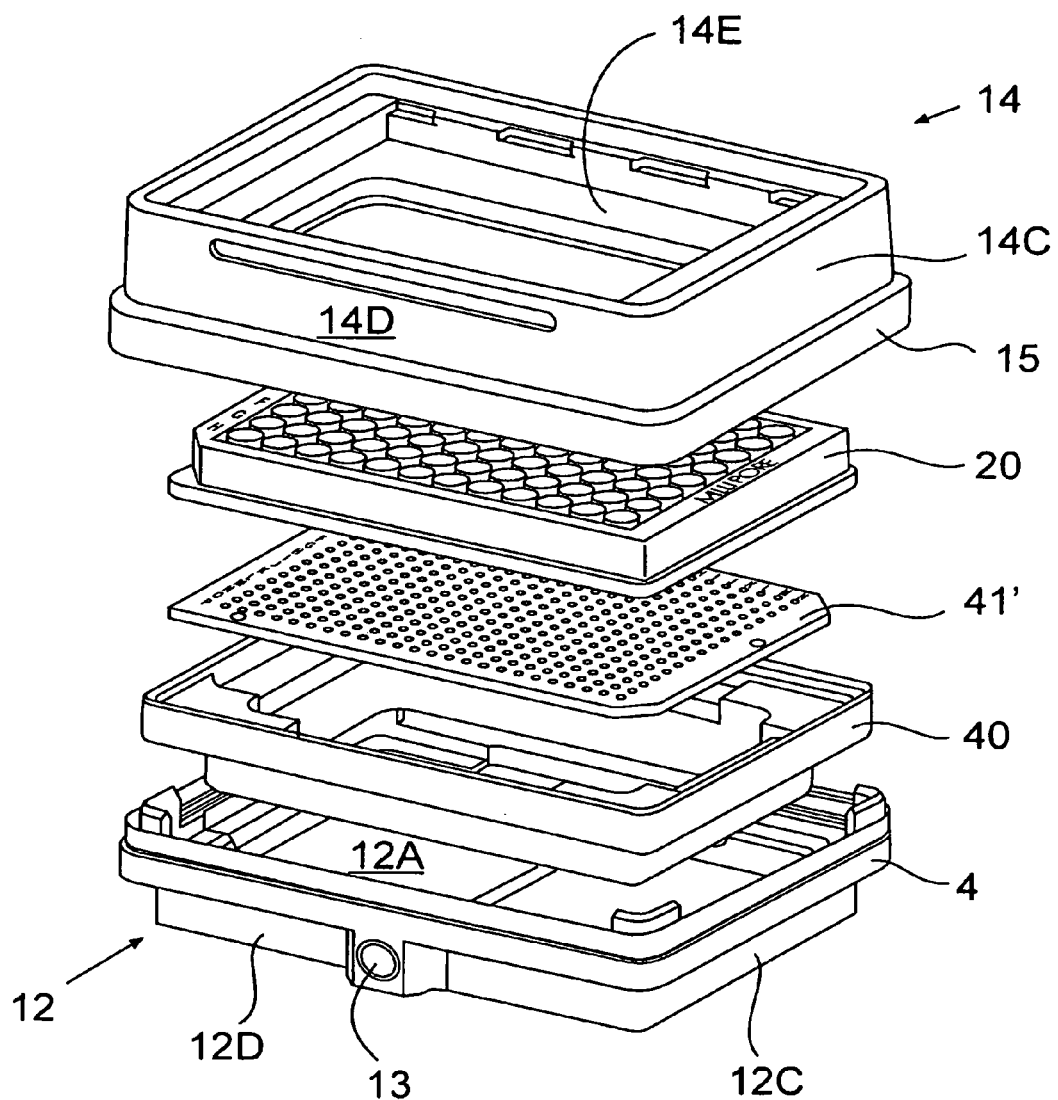

FIGS. 4A and 4B illustrate a further embodiment of the manifold of the present invention. This embodiment is useful for the direct transferring of eluant from filter plate 20 to one or more MALDI targets. Specifically, sample preparation prior to analysis by MALDI-TOF Mass Spectrometry often involves desalting and concentration of samples (e.g., peptides). Simultaneous preparation and analysis of multiple samples is often desirable, and can be carried out using the manifold assembly of the present invention. Accordingly, instead of the collection plate 21 of the embodiment of FIG. 1, or the support tray of the embodiment of FIG. 3, a target tray 40 is used. The design of the target tray 40 is not particular limited, and will depend upon the configuration of the target(s) chosen. The tray 40 can hold one or more targets. For example, in the FIG. 4A embodiment, four MALDI targets 41 commercially available from Applera Corporation are used. Alternatively, as shown in FIG. 4B, a single target 41' such as a MALDI target commercially available from Bruker Daltonics can be used. The target tray 40 is positioned under the spouts of each well in the filter plate 20, with the correct stack height enabling the collar 14 to seal against the base 12 as before. As in the embodiments of FIGS. 1 and 3, the application of vacuum (e.g., the transition from atmospheric pressure to a different pressure) does not result in any z-axis movement of the operative component, which in this case is the filter plate stacked on top of the MALDI target(s).

Figure 12:
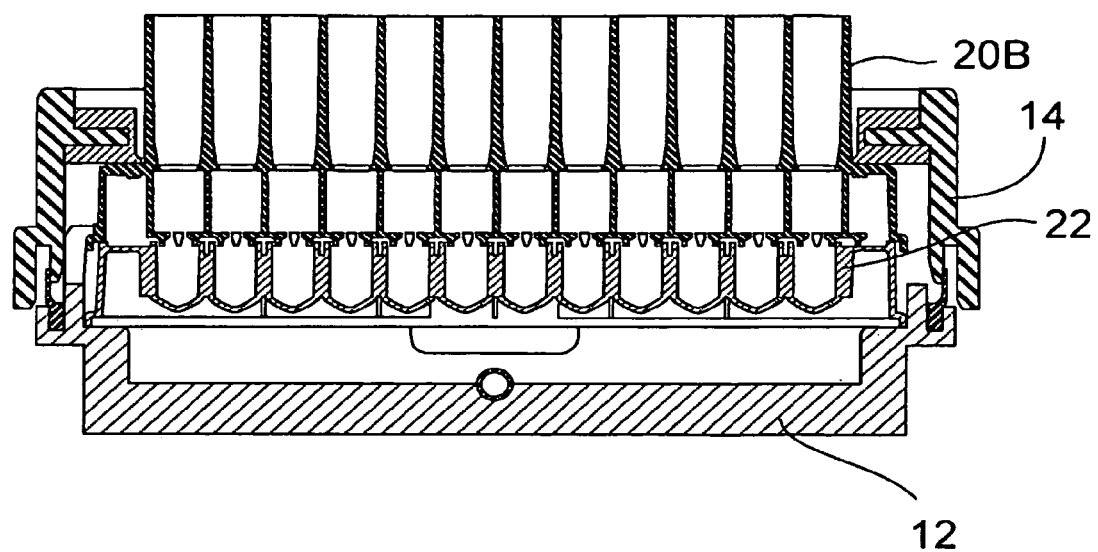
FIG. 12 is a cross-sectional view of the manifold assembly utilizing a deep well filter plate and a regular collection plate.
Figure 13:
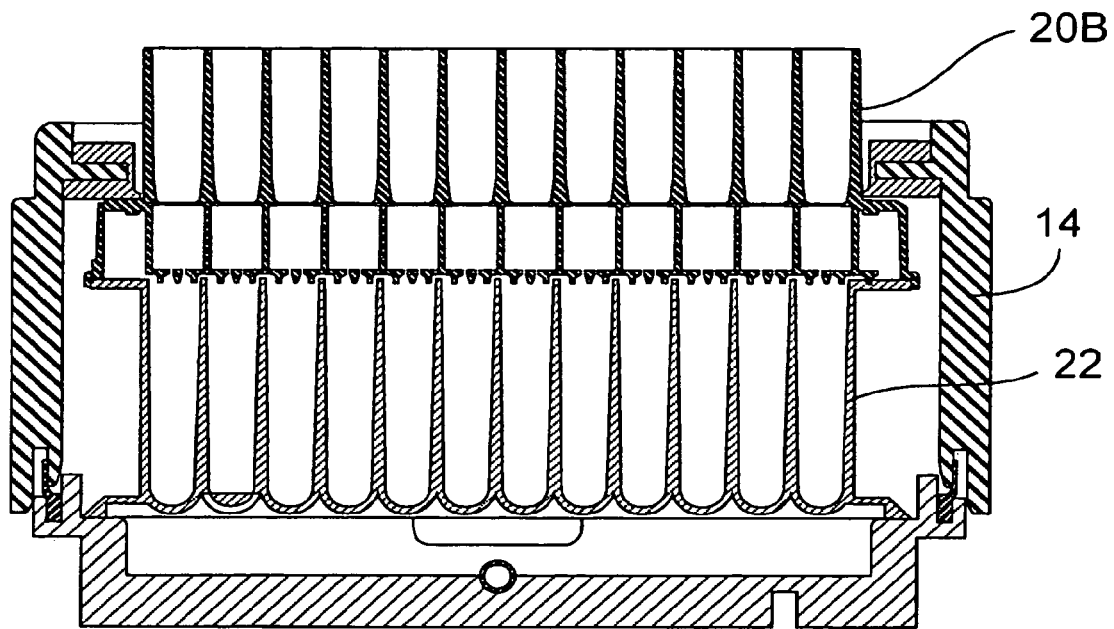
FIG. 13 is a cross-sectional view of the manifold assembly utilizing a deep well filter plate and collection plate.

In each of these embodiments, the stack height is critical to the sealing of the assembly. If a deep well filter plate were used, for example, a taller collar 14 and/or base 12, or an extension with appropriately located additional sealing gaskets, can be used, to insure the seal between the top of the plate and the flange on the base 12. FIG. 12 shows the use of a deep well filter plate 20B with a regular depth collection plate 22 in which the plate is designed to fit within the opening of the collar 14 so that a longer collar and/or base is not needed. FIG. 13 shows a system using a deep well filter plate 20B and a deep well collection plate 22B. In this embodiment, the collar 14B has been made taller to provide the exact height requirement for the desired plates used.

The components of the stacked unit (e.g., the filter plate 20 and collection plate 22, or the filter plate 20, target 41 and target tray 40) do not move independently of one another, since they are positioned in stacked relationship on the base 12 and any movement is limited to the collar 14. As a result, their relative position remains constant regardless of whether the assembly is under vacuum, thereby allowing a liquid handler to be programmed to dispense to the unit, for example.

Figure 5:
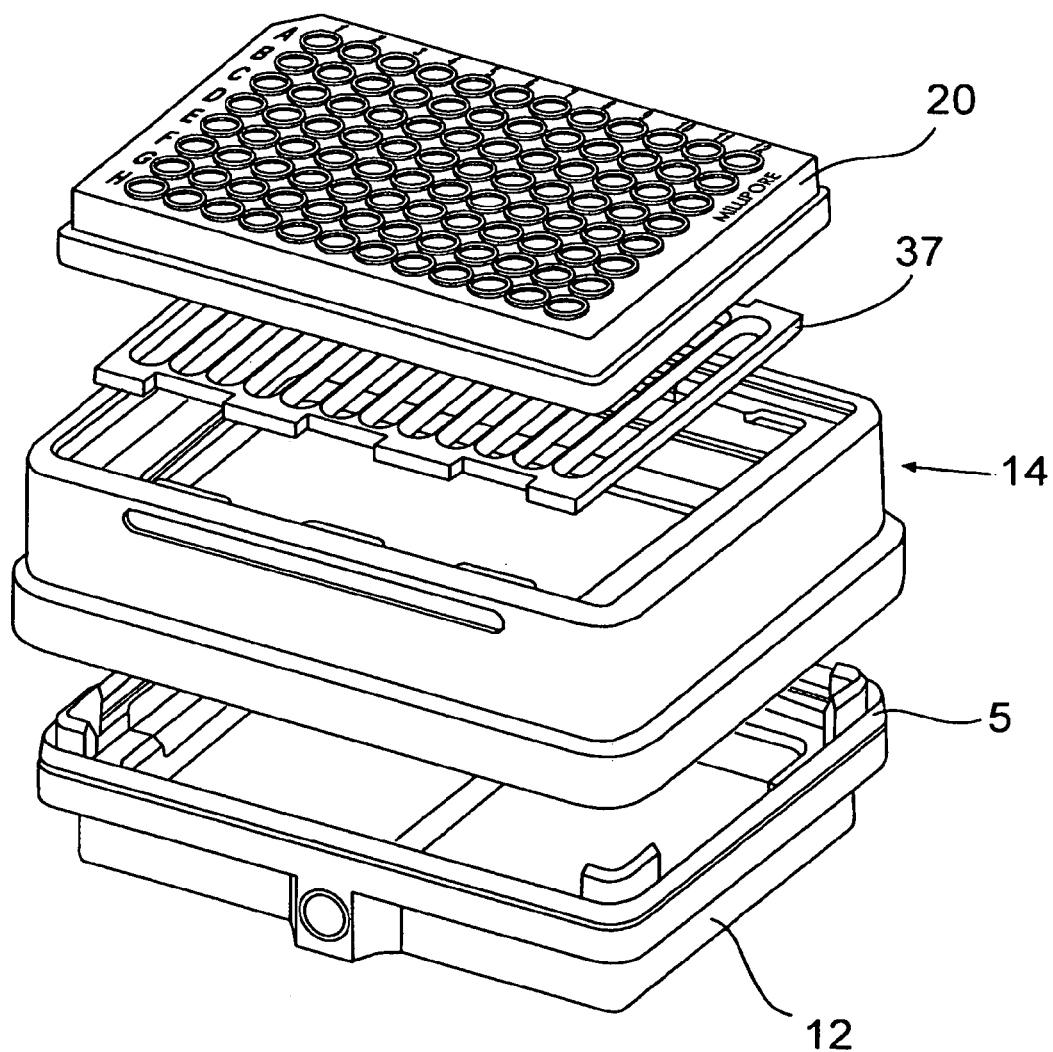
FIG. 5 is an exploded view of a multiwell plate sealed to the top of the manifold assembly in accordance with an embodiment of the present invention.
Figure 6:
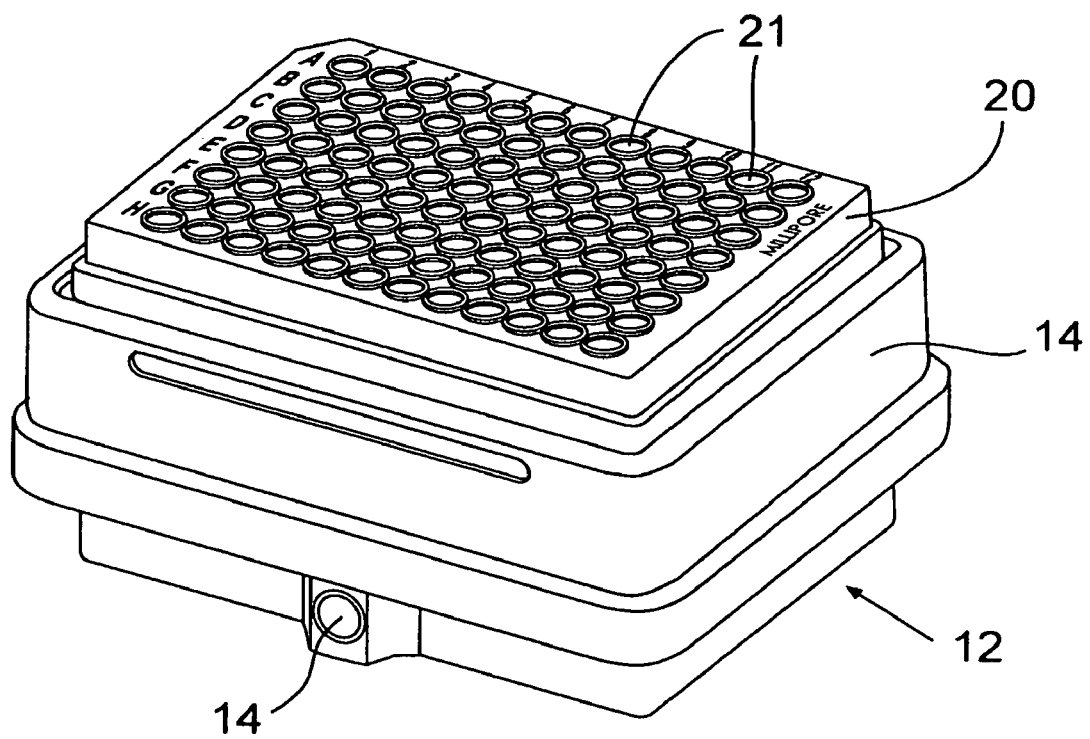
FIG. 6 is a perspective view of the assembly of FIG. 5.

FIGS. 5 and 6 illustrate the versatility of the manifold assembly of the present invention. In this embodiment, the collar 14 is place in sealing relationship with base 12, and a sample preparation device such as a multiwell plate 20 is placed on the top surface of the collar 14. An optional grid 37 can be positioned under the plate 20 to assist in supporting the plate 20. The plate 20 seals against the top gasket positioned in the collar 14. Accordingly, vacuum can be used as the driving force to filter sample through the plate 20. This enables a quick wash procedure without having to place the filter plate inside the manifold. The top gasket can accept a wide variety of support structures for use with unique applications, such as a 384 SEQ plate rib structure for drop removal and a Multiscreen® underdrain support grid, both commercially available from Millipore Corporation.

Since the modular design of the manifold assembly allows for various applications, the components of the present invention can be sold as a kit. For example, several different size collars can be provided in the kit in order to accommodate sample processing devices having different stack heights, such as where deep well filtration plates are used. Similarly, numerous different sample processing devices can be provided in the kit, including filtration plates with membranes of different functionality, collection plates, MALDI TOF targets, support grids, underdrains, washing inserts, etc.

What is claimed:

1. A manifold assembly comprising:
    a collar having a substantially vertical side wall including a bottom periphery region forming a skirt;
    a base having a peripheral portion;
    a first seal positioned between the collar and the base wherein the skirt sealingly positions over the peripheral portion of the base;
    a first sample-processing device having a bottom surface and an outer perimeter edge wherein the collar is positioned on the outer perimeter edge of the first sample processing device;
    a porous membrane attached to the bottom surface;
    a second seal comprising a gasket positioned between the first sample processing device and the collar; and
    a second sample processing device stacked below the first sample processing device to form an integral stacked unit preventing relative movement between the first and second devices, the stacked unit positioned between the collar and the base.

2. The manifold assembly of claim 1, wherein the first sample processing device is a multiwell filtration plate, the porous membrane covers all of the wells on the multiwell filtration plate, and the porous membrane is selected from the group consisting of glass fibers, glass mats, glass cloths, depth filters, nonwovens, woven meshes, microporous membranes, ultrafiltration membranes, and combinations thereof.

3. The manifold assembly of claim 1, wherein the first sample processing device is selected from the group consisting of filter plates, chromatography plates, DNA capture plates, RNA capture plates, spacers, support plates, plasmid capture plates, flow directors, MALDI target trays, MALDI targets, collection plates and combinations thereof.

4. The manifold assembly of claim 1, wherein the second sample processing device is selected from the group consisting of filter plates, chromatography plates, DNA capture plates, RNA capture plates, plasmid capture plates, spacers, support plates, flow directors, wicks, MALDI target trays, MALDI targets, collection plates and combinations thereof.

5. The manifold assembly of claim 1, wherein the first seal is a gasket.

6. The manifold assembly of claim 1, wherein the first seal allows for variability in the height of the first and second devices.

7. The manifold assembly of claim 1, wherein the first seal is created with a gasket positioned within the base, the sealing being along the substantially vertical side walls of the collar.

8. The manifold assembly of claim 1, wherein the first and second seal are a unitary seal.

9. The manifold assembly of claim 1, further comprising a vacuum source, and wherein the base comprises a port for communication with the vacuum source.

10. The manifold assembly of claim 1, further comprising a vacuum source, and wherein the collar comprises a port for communication with the vacuum source.

11. The manifold assembly of claim 1, wherein the relative movement of the first and second devices of the integral stack unit is unaffected by the application of vacuum to the manifold.

12. The manifold assembly of claim 1 wherein the top surface of the first sample processing device lies below the top surface of the collar.

13. The manifold assembly of claim 1 further comprising a third sample processing device stacked below the first sample processing device and above second sample processing device, wherein the third sample processing device is selected from the group consisting of filter plates, chromatography plates, DNA capture plates, RNA capture plates, spacers, support plates, plasmid capture plates, flow directors, MALDI target trays, MALDI targets, collection plates, glass fibers, glass mats, glass cloths, depth filters, nonwovens, woven meshes, microporous membranes, ultrafiltration membranes, and combinations thereof.

14. A manifold assembly comprising:
a collar having a substantially lateral side wall;
a base in sealing engagement with the collar, the base comprising an outer peripheral flange and a side wall which together form a peripheral groove;
a first gasket positioned between the base and the collar wherein a portion of first gasket contacts a slot formed in the collar;
wherein the collar comprises a skirt formed along a bottom periphery of the substantially lateral wall such that the skirt sealingly positions over a peripheral portion of the base;
a first sample processing device having a bottom surface,
a porous membrane attached to the bottom surface; and
a second gasket positioned between the sample processing device and the collar, such that the sample processing is in sealing engagement with the collar.

15. The manifold assembly of claim 14, further comprising a removable support positioned below the first sample processing device.

16. The manifold assembly of claim 14, wherein the first sample processing device is a multiwell filtration plate, the porous membrane covers all of the wells on the multiwell filtration plate, and the porous membrane is selected from the group consisting of glass fibers, glass mats, glass cloths, depth filters, nonwovens, woven meshes, microporous membranes, ultrafiltration membranes, and combinations thereof.

17. The manifold assembly of claim 14 wherein the first sample processing device is selected from the group consisting of filter plates, chromatography plates, DNA capture plates, RNA capture plates, spacers, support plates, plasmid capture plates, flow directors, MALDI target trays, MALDI targets, collection plates and combinations thereof.

18. The manifold assembly of claim 14, further comprising a vacuum source, and the collar comprises a port for communication with the vacuum source.

19. The manifold assembly of claim 14, wherein the relative movement of the first and second devices of the integral stack unit is unaffected by the application of vacuum to the manifold.

20. The manifold assembly of claim 14, further comprising a third sample processing device stacked below the first sample processing device and above second sample processing device, wherein the third sample processing device is selected from the group consisting of filter plates, chromatography plates, DNA capture plates, RNA capture plates, spacers, support plates, plasmid capture plates, flow directors, MALDI target trays, MALDI targets, collection plates, glass fibers, glass mats, glass cloths, depth filters, nonwovens, woven meshes, microporous membranes, ultrafiltration membranes, and combinations thereof.

21. A manifold assembly comprising:
a collar having a substantially vertical side wall including a bottom periphery region forming a skirt;
a base having a peripheral portion wherein the skirt sealingly positions over the peripheral portion of the base;
a first sample processing device having an outer perimeter edge, and a bottom surface;
a porous membrane attached to the bottom surface;
a second processing device stacked below the first sample processing device to form an integral stacked unit preventing relative movement between the first and second devices, the stacked unit positioned between the collar and the base, and the collar is positioned on the outer perimeter edge of the first sample processing device; and
a first seal between the collar and the base; and a second seal between the first sample processing device and the collar, wherein the first and second seals are a unitary seal.

22. The manifold assembly of claim 21 wherein the top surface of the first sample processing device lies below the top surface of the collar.

23. The manifold assembly of claim 21 further comprising a third sample processing device stacked below the first sample processing device and above second sample processing device, wherein the third sample processing device is selected from the group consisting of filter plates, chromatography plates, DNA capture plates, RNA capture plates, spacers, support plates, plasmid capture plates, flow directors, MALDI target trays, MALDI targets, collection plates, glass fibers, glass mats, glass cloths, depth filters, nonwovens, woven meshes, microporous membranes, ultrafiltration membranes, and combinations thereof.

24. A manifold assembly comprising:
a base;
a collar comprising a skirt formed along a bottom periphery of a lateral wall such that the skirt positions over a peripheral portion of the base;
a first sample processing device comprising a multiwell filtration plate or a single well filtration device;
a porous membrane positioned in one or more of the wells;
a second processing device stacked below the first sample processing device to form an integral stacked unit preventing relative movement between the first and second devices, the stacked unit positioned between the collar and the base;

a first seal between the collar and the base; and a second seal between the first sample processing device and the collar, wherein the first and second seals are a unitary seal;

wherein the first sample processing device is seated recessed within the collar such that the top surface of the first sample processing device lies below the top surface of the collar.

25. The manifold assembly of claim 24 further comprising a third sample processing device stacked below the first sample processing device and above second sample processing device, wherein the third sample processing device is selected from the group consisting of filter plates, chromatography plates, DNA capture plates, RNA capture plates, spacers, support plates, plasmid capture plates, flow directors, MALDI target trays, MALDI targets, collection plates, glass fibers, glass mats, glass cloths, depth filters, nonwovens, woven meshes, microporous membranes, ultrafiltration membranes, and combinations thereof.

26. A manifold assembly comprising:

a base comprising a flat surface and having a peripheral portion;

a collar comprising a substantially vertical side wall including a bottom periphery region forming a skirt and a port for communication with a vacuum source;

a first sealing gasket positioned between the base and the collar wherein the skirt sealingly positions over the peripheral portion of the base; and a first sample processing device having a bottom surface and an outer perimeter edge wherein the collar is sealingly positioned on the outer perimeter edge of the first sample processing device, a porous membrane attached to the bottom surface, and a second seal comprising a gasket positioned between the first sample processing device and the collar.

27. The manifold assembly of claim 26 wherein the base is selected from the group consisting of a bench top, a floor and a wall.

28. The manifold assembly of claim 26, further comprising a removable support positioned below the sample processing device.

29. The manifold assembly of claim 26, wherein the first sample, processing device is a multiwell filtration plate, the porous membrane covers all of the wells on the multiwell filtration plate, and the porous membrane is selected from the group consisting of glass fibers, glass mats, glass cloths, depth filters, nonwovens, woven meshes, microporous membranes, ultrafiltration membranes, and combinations thereof.

30. The manifold assembly of claim 26, further comprising a vacuum source.

31. The manifold assembly of claim 26, wherein the first sample processing device is selected from the group consisting of filter plates, chromatography plates, DNA capture plates, RNA capture plates, plasmid capture plates, flow directors and combinations thereof.

32. The manifold assembly of claim 26, further comprising a second sample processing device stacked below the first sample processing device to form an integral stacked unit positioned between the collar and the base, wherein the second sample processing device is selected from the group consisting of filter plates, chromatography plates, DNA capture plates, RNA capture plates, plasmid capture plates, spacers, support plates, flow directors, wicks, MALDI target trays, MALDI targets, collection plates and combinations thereof.

33. The manifold assembly of claim 32, further comprising a third sample processing device stacked below the first sample processing device and above second sample processing device, wherein the third sample processing device is selected from the group consisting of filter plates, chromatography plates, DNA capture plates, RNA capture plates, spacers, support plates, plasmid capture plates, flow directors, MALDI target trays, MALDI targets, collection plates, glass fibers, glass mats, glass cloths, depth filters, nonwovens, woven meshes, microporous membranes, ultrafiltration membranes, and combinations thereof.

34. A method of applying vacuum to a manifold assembly, comprising:

a) providing a vacuum source;

b) providing a manifold comprising a collar having a substantially vertical side wall including a bottom periphery region forming a skirt;

a base having a peripheral portion;

a first seal positioned between the collar and the base wherein the skirt sealingly positions over the peripheral portion of the base;

a first sample-processing device having a bottom surface and an outer perimeter edge wherein the collar is positioned on the outer perimeter edge of the first sample processing device;

a porous membrane attached to the bottom surface;

a second seal comprising a gasket positioned between the first sample processing device and the collar;

a second sample processing device stacked below the first sample processing device to form an integral stacked sample processing unit preventing, relative movement between the first and second devices, the stacked unit positioned between the collar and the base, and a port for communication with a vacuum source, the port being formed in a manifold component selected from the group consisting of the base and the collar;

c) positioning the integral stacked sample processing unit between the base and the collar;

d) positioning the collar on the base; and e) applying a vacuum to the manifold with the vacuum source, whereby the collar is forced into sealing engagement with the integral stacked sample processing unit without causing movement of the sample processing unit.

35. The method of claim 34, wherein the first processing device is a multiwell filtration plate, and a porous membrane covers all of the wells on the multiwell filtration plate.

36. The method of claim 34, wherein the sealing engagement between the collar and the base is adaptable to different sample processing unit stack heights.

37. The method of claim 34, wherein functional inserts are positionable in the base.

38. The method of claim 34, wherein the second device is selected from the group consisting of a sample processing device, a removable support, a MALDI target, and a collection plate.

39. The method of claim 34, wherein the second device is a collection plate containing more than one well.

40. The method of claim 34, wherein the integral stacked sample processing unit further comprises a third sample processing device stacked below the first sample processing device and above second sample processing device, wherein the third sample processing device is selected from the group consisting of filter plates, chromatography plates, DNA capture plates, RNA capture plates, spacers, support plates, plasmid capture plates, flow directors, MALDI target trays, MALDI targets, collection plates, glass fibers, glass mats, glass cloths, depth filters, nonwovens, woven meshes, microporous membranes, ultrafiltration membranes, and combinations thereof.

41. A method of applying vacuum to a manifold assembly, comprising:
   a) providing a vacuum source;
   b) providing a manifold comprising a base having a peripheral portion and a port for communication with the vacuum source, a collar having a substantially vertical side wall including a bottom periphery region forming a skirt, a first seal positioned between the collar and the base wherein the skirt sealingly positions over the peripheral portion of the base, a first sample-processing device having a bottom surface and an outer perimeter edge wherein the collar is positioned on the outer perimeter edge of the first sample processing device, and a porous membrane attached to the bottom surface, second seal comprising a gasket positioned between the first sample processing device and the collar; and
   c) positioning the first sample processing device between the base and the collar;
   d) positioning the collar on the base;
   e) applying a vacuum to the manifold with the vacuum source, whereby the collar is forced into sealing engagement with the base and the first sampling processing device without causing movement of the first sample processing device.

42. The method of claim 41 further comprising a second sample processing device stacked below the first processing device to form an integral stacked sample processing unit preventing relative movement between the first and second devices, the integral stacked unit positioned between the collar and the base, wherein the second sample processing device is selected from the group consisting of filter plates, chromatography plates, DNA capture plates, RNA capture plates, plasmid capture plates, spacers, support plates, flow directors, wicks, MALDI target trays, MALDI targets, collection plates, and combinations thereof.

43. The method of claim 41 wherein the first sample processing plate is a multiwall filtration plate, and a porous membrane covers all of the wells on the multiwell filtration plate.

44. The method of claim 41 further comprising a second sample processing device stacked below the first sample processing device, wherein the second sample processing plate is multiwall filtration plate, and a porous membrane covers all of the wells on the multiwell filtration plate, wherein the membrane is selected from the group consisting of microporous and ultrafiltration membranes.

45. The method of claim 42, wherein the integral stacked sample processing unit further comprises a third sample processing device stacked below the first sample processing device and above second sample processing device, wherein the third sample processing device is selected from the group consisting of filter plates, chromatography plates, DNA capture plates, RNA capture plates, spacers, support plates, plasmid capture plates, flow directors, MALDI target trays, MALDI targets, collection plates, glass fibers, glass mats, glass cloths, depth filters, nonwovens, woven meshes, microporous membranes, ultrafiltration membranes, and combinations thereof.

* * * * *